US012688701B2

(12) United States Patent     (10) Patent No.: US 12,688,701 B2
    Cooprider et al.              (45) Date of Patent:     *Jul. 21, 2026

(54) CAMERA MONITOR SYSTEM WITH CAMERA WING UNFOLDING STATUS DETECTION BASED UPON IMAGE PROCESSING

(71) Applicant: Stoneridge, Inc., Novi, MI (US)

(72) Inventors: Troy Otis Cooprider, White Lake, MI (US); Liang Ma, Rochester, MI (US)

(73) Assignee: Stoneridge, Inc., Novi, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/911,944

(22) Filed: Oct. 10, 2024

(65) Prior Publication Data

US 2025/0124719 A1     Apr. 17, 2025

Related U.S. Application Data

(60) Provisional application No. 63/544,319, filed on Oct. 16, 2023.

(51) Int. Cl.
    *G06V 20/58*     (2022.01)
    *B60R 1/25*     (2022.01)
                    (Continued)

(52) U.S. Cl.
    CPC ................ *G06V 20/58* (2022.01); *B60R 1/25* (2022.01); *G06T 7/80* (2017.01); *G06V 10/44* (2022.01);
                    (Continued)

(58) Field of Classification Search
    CPC .... G06V 20/58; G06V 10/7715; G06V 10/44; G06T 7/80; G06T 7/85;
                    (Continued)

(56)     References Cited

U.S. PATENT DOCUMENTS 8,643,724 B2     2/2014   Schofield et al.
9,834,216 B2     12/2017  Pawlicki et al.
                    (Continued)

FOREIGN PATENT DOCUMENTS

EP         2374662 A2     10/2011
WO     2021043393 A1      3/2021
                    (Continued)

OTHER PUBLICATIONS

International Search Report and Written Opinion for International Application No. PCT/US2024/050738 mailed Jan. 31, 3025.
                    (Continued)

*Primary Examiner* — Brian P Yenke
(74) *Attorney, Agent, or Firm* — Carlson, Gaskey & Olds, P.C.

(57)     ABSTRACT

A method of checking wing position in a camera monitor system includes calibrating a wing position that supports a camera relative to a vehicle to provide a desired field of view, extracting a reference feature from a calibrated image from the camera, storing the reference feature, triggering a wing position check, capturing a current image from the camera, the current image has a current position of the reference feature, comparing the current position of the reference feature to the stored reference feature, and outputting a result of the wing position check if a difference from the comparing step exceeds a threshold value.

14 Claims, 7 Drawing Sheets

(51) Int. Cl.

| | |
|---|---|
| *G06T 7/80* | (2017.01) |
| *G06V 10/44* | (2022.01) |
| *G06V 10/77* | (2022.01) |
| *H04N 23/695* | (2023.01) |

(52) U.S. Cl.
CPC ....... *G06V 10/7715* (2022.01); *H04N 23/695* (2023.01); *B60R 2300/30* (2013.01); *B60R 2300/80* (2013.01); *G06T 2207/30252* (2013.01)

(58) Field of Classification Search
CPC ........ G06T 2207/30252; H04N 17/002; H04N 23/695; B60R 2300/30; B60R 2300/80; B60R 1/25; B60R 1/22; B60R 1/072; B60R 2001/1253
See application file for complete search history.

(56) References Cited

U.S. PATENT DOCUMENTS

| | | | | |
|---|---|---|---|---|
| 11,282,234 | B2 * | 3/2022 | Jiang | B60W 40/02 |
| 2001/0006554 | A1 * | 7/2001 | Kakinami | G01S 11/12 |
| | | | | 382/104 |
| 2006/0092534 | A1 * | 5/2006 | Ivanov | B60R 1/025 |
| | | | | 359/842 |
| 2007/0291125 | A1 * | 12/2007 | Marquet | H04N 13/204 |
| | | | | 348/207.99 |
| 2015/0103147 | A1 * | 4/2015 | Ho | G06T 7/85 |
| | | | | 348/47 |
| 2016/0012589 | A1 * | 1/2016 | Hamer | H04N 23/90 |
| | | | | 348/148 |
| 2016/0086033 | A1 | 3/2016 | Molin et al. | |
| 2016/0142596 | A1 | 5/2016 | DePaschoal | |
| 2017/0282796 | A1 * | 10/2017 | Kosaki | B60R 1/26 |
| 2018/0090039 | A1 | 3/2018 | Singireddy | |
| 2018/0300899 | A1 * | 10/2018 | Dreuw | H04N 17/002 |
| 2019/0152392 | A1 | 5/2019 | DePaschoal et al. | |
| 2020/0051282 | A1 * | 2/2020 | Watanabe | G06T 7/593 |
| 2020/0294401 | A1 | 9/2020 | Kerecsen | |
| 2021/0078496 | A1 * | 3/2021 | Yamamoto | B60R 1/27 |
| 2021/0158561 | A1 | 5/2021 | Park et al. | |
| 2021/0178984 | A1 * | 6/2021 | Goth | G06V 20/52 |
| 2021/0380143 | A1 | 12/2021 | Alvarez et al. | |
| 2022/0161724 | A1 * | 5/2022 | Slama | B60R 1/06 |
| 2022/0161760 | A1 * | 5/2022 | Moeller | G08B 21/182 |
| 2023/0206497 | A1 * | 6/2023 | Sharma | B60Q 9/00 |
| | | | | 701/33.1 |
| 2024/0017670 | A1 * | 1/2024 | Martin | B60R 1/12 |
| 2025/0121773 | A1 * | 4/2025 | He | H04N 23/695 |
| 2026/0087826 | A1 * | 3/2026 | He | G06T 7/80 |

FOREIGN PATENT DOCUMENTS

| | | | |
|---|---|---|---|
| WO | WO 2021/043393 | * | 3/2021 |
| WO | 2023121908 A1 | | 6/2023 |

OTHER PUBLICATIONS

International Preliminary Report on Patentability for International Application No. PCT/US2024/050738 mailed Jan. 2, 2026.

* cited by examiner

CAMERA MONITOR SYSTEM WITH CAMERA WING UNFOLDING STATUS DETECTION BASED UPON IMAGE PROCESSING

CROSS-REFERENCE TO RELATED APPLICATION

This application claims priority to Untied States Provisional Application No. 63/544,319 filed Oct. 16, 2023.

TECHNICAL FIELD

This disclosure relates to a camera monitor system (CMS) for use in a commercial truck or similar vehicle, and, in particular, to a CMS capable of checking a wing position using image processing.

BACKGROUND

Mirror replacement systems, and camera systems for supplementing mirror views, are utilized in commercial vehicles to enhance the ability of a vehicle operator to see a surrounding environment. Camera monitor systems (CMS) utilize one or more cameras to provide an enhanced field of view to a vehicle operator. In some examples, the CMS covers a larger field of view than a conventional mirror, or includes views that are not fully obtainable via a conventional mirror.

In a typical CMS, there is a camera arm, or camera wing, arranged on each of the left- and right-hand sides of the tractor to provide Class II and Class IV views. A display is provided on each A-pillar on driver and passenger sides to display the field of view for the camera arm on that side, simulating a conventional mirror.

In some applications, the camera wing may be configured to fold, either manually or in response to actuation of a motor. For some customers, it may be desirable to automatically determine without driver input whether the camera is unfolded and in a position that will continue provide the desired view. Thus, it may be desirable to provide some CMS with camera wing position verification. One example prior art system includes a physical sensor packaged within the camera wing, but such a design requires additional components and wiring, adding cost to the CMS.

SUMMARY

In one example embodiment, a method of checking wing position in a camera monitor system includes calibrating a wing position that supports a camera relative to a vehicle to provide a desired field of view, extracting a reference feature from a calibrated image from the camera, storing the reference feature, triggering a wing position check, capturing a current image from the camera, the current image has a current position of the reference feature, comparing the current position of the reference feature to the stored reference feature, and outputting a result of the wing position check if a difference from the comparing step exceeds a threshold value.

In a further example embodiment of any of the foregoing embodiments, the calibrating step is performed upon installation of the wing onto the vehicle.

In a further example embodiment of any of the foregoing embodiments, the calibrating step is performed with the wing in an unfolded position and the camera trained upon a legally prescribed field of view.

In a further example embodiment of any of the foregoing embodiments, the reference feature is provided on a tractor of the vehicle.

In a further example embodiment of any of the foregoing embodiments, the reference feature includes a vertical edge of the tractor.

In a further example embodiment of any of the foregoing embodiments, the triggering step is performed based upon at least one of gear position and engine operating state.

In a further example embodiment of any of the foregoing embodiments, the triggering step is performed based upon a time interval.

In a further example embodiment of any of the foregoing embodiments, the comparing step includes comparing a distance between at least a portion of the stored reference feature from the current position of the reference feature in 2D space.

In a further example embodiment of any of the foregoing embodiments, the distance is a distance between pixels in captured images of the calibrated image and the current image.

In a further example embodiment of any of the foregoing embodiments, the result is at least one of a visible warning and an audible warning.

In another example embodiment, a camera monitor system (CMS) for a vehicle includes a wing that has a fixed portion configured to be secured to a vehicle, and a foldable portion that is pivotably mounted on the fixed portion, a camera that is mounted to the foldable portion and has a camera with an image capture unit configured to provide a desired field of view of the vehicle, a display that is configured to depict at least a portion of the field of view, an input that is configured to trigger a wing position check, and a controller that is in communication with the camera and the display. The controller includes a calibration module in which a reference feature is extracted from a calibrated image of the camera in which the desired field of view is provided. The controller has a memory in which the reference feature is stored. The controller includes a wing position verification module responsive to the input. The wing position verification module is configured to capture a current image from the camera that has a current position of the reference feature, comparing the current position reference feature to the stored reference feature, and outputting a result of the wing position check if a difference from comparing step exceeds a threshold value.

In a further example embodiment of any of the foregoing embodiments, the wing includes a motor that is in communication with the controller. The motor is configured to fold and unfold the foldable portion relative to the fixed portion in response to a command from the controller. The controller is configured to send the command to the motor in response to the difference being above the threshold value in order to actuate the foldable portion and provide the desired field of view.

In a further example embodiment of any of the foregoing embodiments, the output is a visible warning on the display.

In a further example embodiment of any of the foregoing embodiments, the desired view corresponds to a legally prescribed view providing at least one of Class II and Class IV views.

In a further example embodiment of any of the foregoing embodiments, the reference feature is provided on a tractor of the vehicle.

In a further example embodiment of any of the foregoing embodiments, the reference feature includes a vertical edge of the tractor.

In a further example embodiment of any of the foregoing embodiments, the input is at least one of a gear position sensor that is configured to provide a gear position and an engine sensor that is configured to provide an engine operating state.

In a further example embodiment of any of the foregoing embodiments, the input is a time interval.

In a further example embodiment of any of the foregoing embodiments, the comparing step includes comparing a distance between at least a portion of the stored reference feature from the current position of the reference feature in 2D space.

In a further example embodiment of any of the foregoing embodiments, the distance is a distance between pixels in captured images of the calibrated image and the current image.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1A:
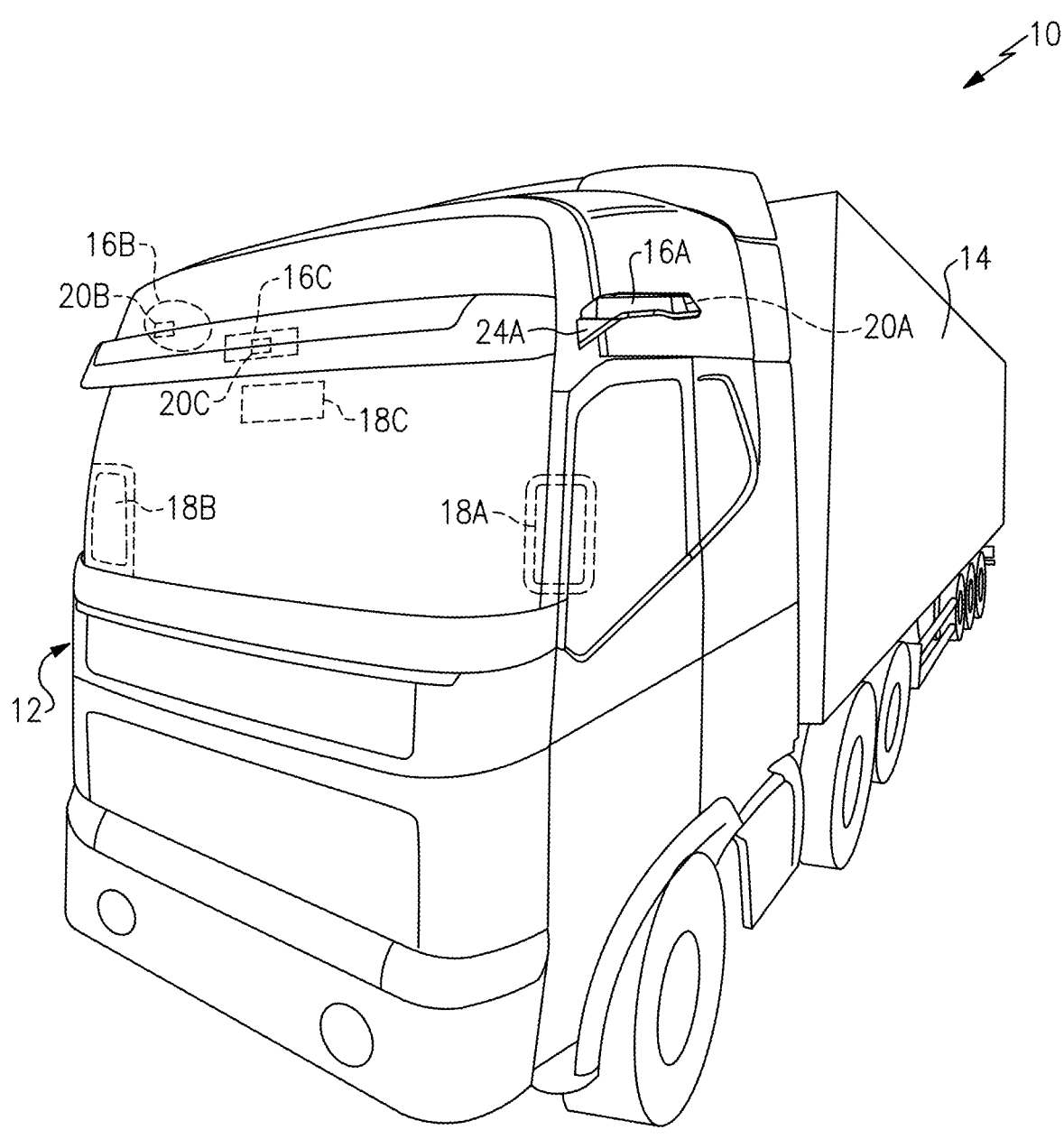
FIG. 1A is a schematic front view of a commercial truck with a camera monitor system (CMS) used to provide at least Class II, Class IV, Class V and Class VI views.
Figure 1B:
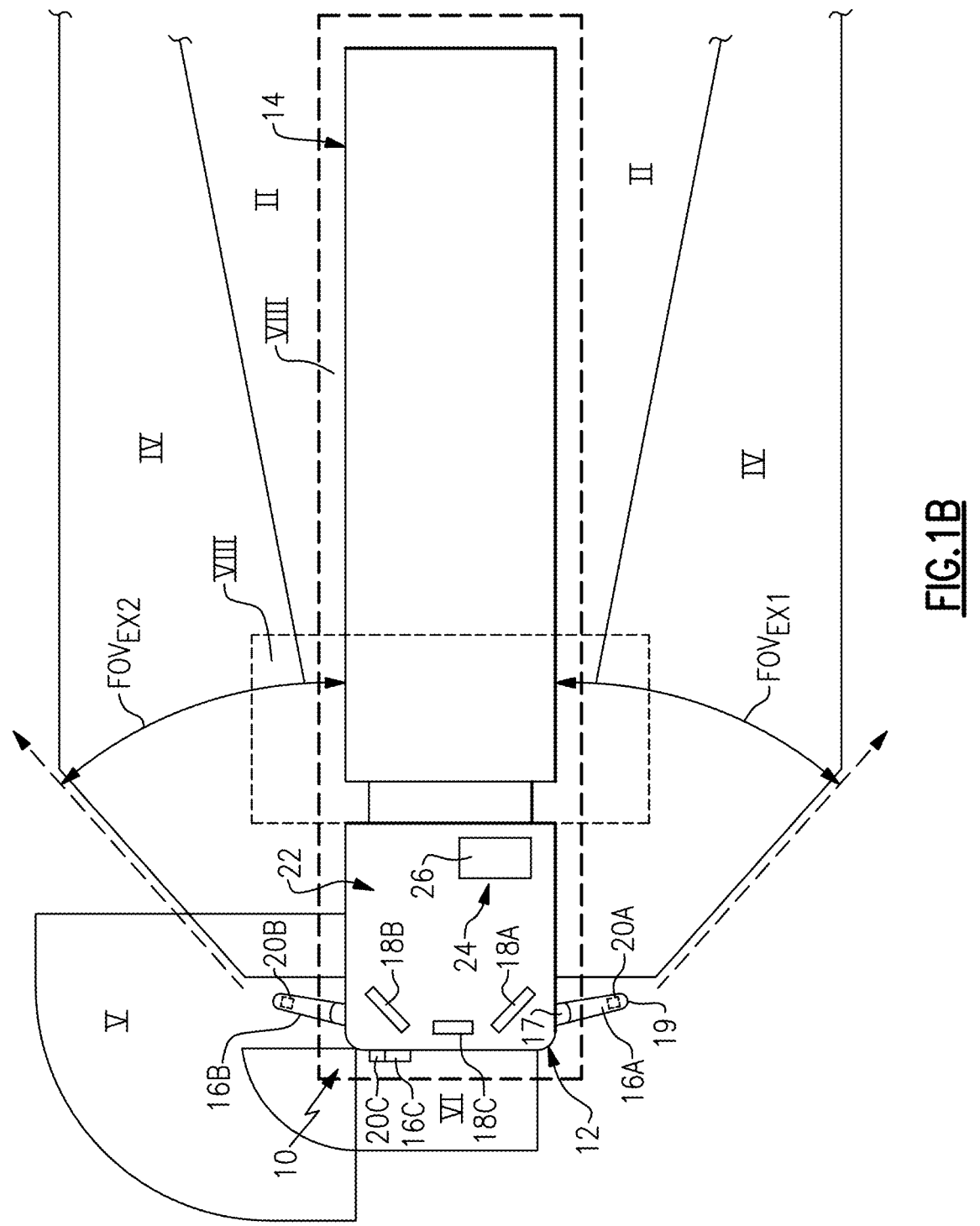
FIG. 1B is a schematic top view of a commercial truck with a CMS providing at least Class II, Class IV, Class V and Class VI views.

A schematic view of a commercial vehicle 10 is illustrated in FIGS. 1A and 1B. The vehicle 10 includes a vehicle cab or tractor 12 for pulling a trailer 14. It should be understood that the vehicle cab 12 and/or trailer 14 may be any configuration. Although a commercial truck is contemplated in this disclosure, the invention may also be applied to other types of vehicles. The vehicle 10 incorporates a camera monitor system (CMS) 15 (FIG. 2) that has driver and passenger side camera arms (i.e., camera wings) 16a, 16b (generally, camera arm 16, or camera wing 16) mounted to the outside of the vehicle cab 12. If desired, the camera arms 16a, 16b may include conventional mirrors integrated with them as well, although the CMS 15 can be used in some examples to entirely replace mirrors. In additional examples, each side can include multiple camera arms, each arm housing one or more cameras and/or mirrors.

Each of the camera arms 16a, 16b includes a base that is secured to, for example, the cab 12. A pivoting arm is supported by the base and may articulate relative thereto. At least one rearward facing camera 20a, 20b (generally, camera 20) is arranged respectively within camera arms 16a, 16b. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. The Class II view on a given side of the vehicle 10 is a subset of the class IV view of the same side of the vehicle 10. Multiple cameras also may be used in each camera arm 16a, 16b to provide these views, if desired. Class II (narrow) and Class IV (wide angle) views are defined in European R46 legislation, for example, and the United States and other countries have similar drive visibility requirements for commercial trucks. Any reference to a "Class" view is not intended to be limiting, but is intended as exemplary for the type of view provided to a display by a particular camera. Each arm 16a, 16b may also provide a housing that encloses electronics, e.g., a controller, that are configured to provide various features of the CMS 15.

First and second video displays 18a, 18b (generally, display 18) are arranged on each of the driver and passenger sides within the vehicle cab 12 on or near the A-pillars 21a, 21b (generally, A-pillar 21) to display Class II and Class IV views on its respective side of the vehicle 10, which provide rear facing side views along the vehicle 10 that are captured by the exterior cameras 20a, 20b.

If video of Class V and/or Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver. The displays 18a, 18b, 18c (generally, display 18) face a driver region 24 within the cabin 22 where an operator is seated on a driver seat 26. The location, size and field(s) of view streamed to any particular display may vary from the configurations described in this disclosure and still incorporate the disclosed invention.

If video of Class VIII views is desired, camera housings can be disposed at the sides and rear of the vehicle 10 to provide fields of view including some or all of the Class VIII zones of the vehicle 10. In such examples, the third display 18c can include one or more frames displaying the Class VIII views. Alternatively, additional displays can be added near the first, second and third displays 18a, 18b, 18c and provide a display dedicated to providing a Class VIII view.

It should be noted that a controller 30 (FIG. 2) for the CMS 15 can be used to implement the various functionalities disclosed in this application. The controller 30 may include one or more discrete units. For example, a centralized architecture may have a common controller arranged in the vehicle 10, while a decentralized architecture may use a controller provided in each of the displays 18a, 18b, for example. Moreover, a portion of the controller 30 may be provided in the vehicle 10, while another portion of the controller 30 may be located elsewhere, for example, the camera arms 16. In another example, a master-slave display configuration may be used where one display includes the controller 30 while the other display receives the commands from the controller 30.

In terms of hardware architecture, such a controller can include a processor, memory (e.g., memory 42, FIG. 2), and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

Figure 2:
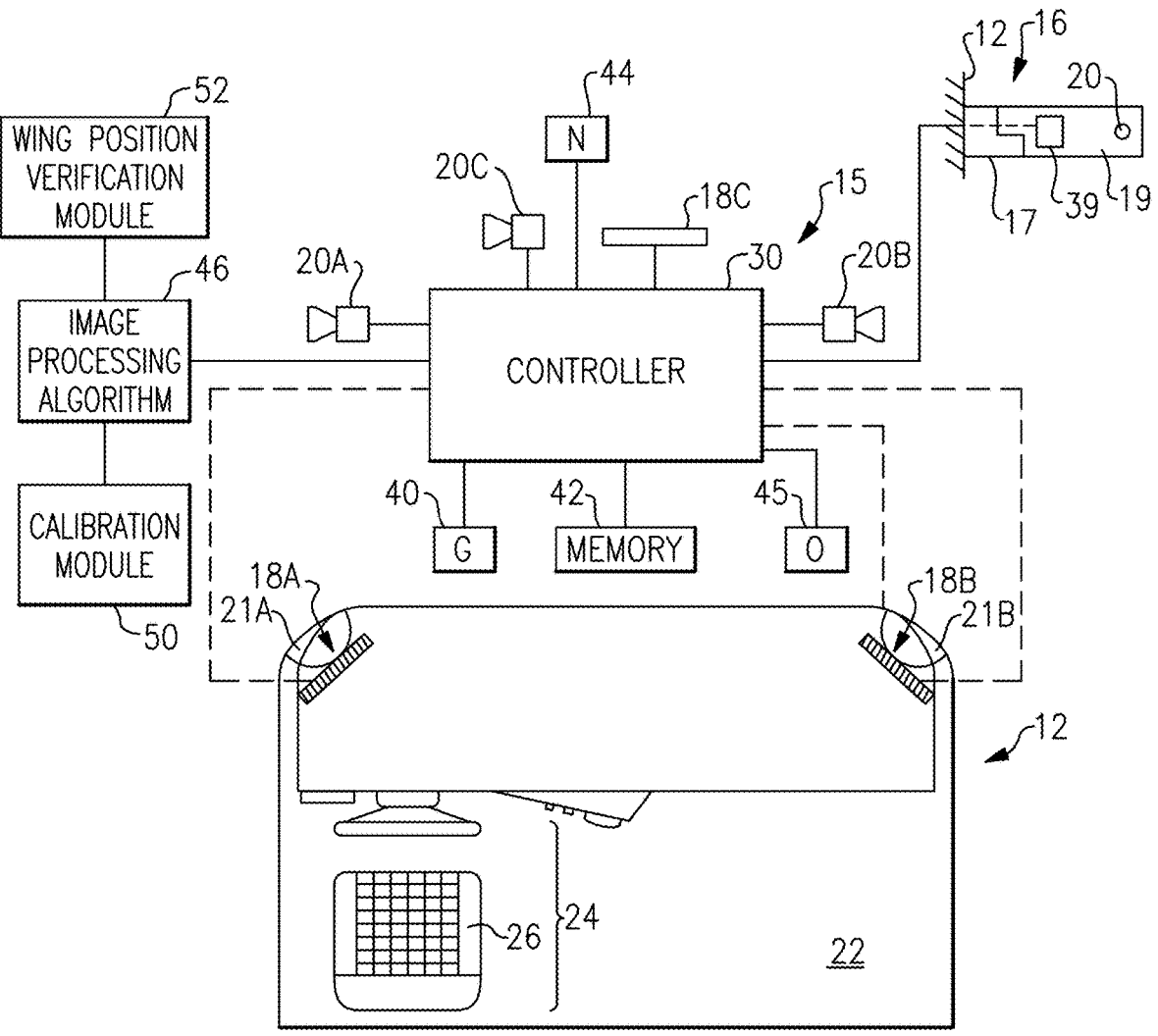
FIG. 2 is a schematic interior view of a vehicle cabin including displays and other schematic CMS features.

The controller 30 may be a hardware device for executing software, particularly software stored in memory (e.g., memory 42, FIG. 2). The controller 30 can be a custom made or commercially available processor, a central processing unit (CPU), an auxiliary processor among several processors associated with the controller, a semiconductor-based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. The memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The disclosed input and output devices that may be coupled to system I/O interface(s) may include input devices, for example but not limited to, a keyboard, mouse, scanner, microphone, camera, mobile device, proximity device, etc. Further, the output devices, for example but not limited to, a printer, display, etc. Finally, the input and output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the controller 30 is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

In one example, shown schematically in FIGS. 1B and 2, the camera arm 16 includes a fixed portion 17 secured to the vehicle 10, e.g., the side of the tractor 12. A foldable portion 19 is pivotally mounted to the fixed portion 17. In one example, a motor 39 is provided in the camera arm 16 to move the foldable portion 19 between folded/stowed position and an unfolded/operating position in response to a command, for example, from the controller 30. In the unfolded operating position, the camera 20 is arranged in a desired view, which may provide one or more legally prescribed views to its display 18.

With reference to FIG. 2, the controller 30 may be in communication with a variety of vehicle components via a CAN bus, LIN bus or other suitable communications architecture. For example, a gear position sensor 40 communicates with the controller 30 and is configured to provide the vehicle gear position, such as park, reverse, neutral, and a forward gear. An engine sensor 44, such as an engine speed sensor, is also in communication with the controller 30 to provide an engine operational state, such as engine idling. Other sensors 45 may be in communication with the controller 30 to provide one or more operational states to the CMS 15 for use with the wing position verification method described below.

Unlike prior art wing position verification schemes, the disclosed CMS 15 does not use additional, dedicated sensors to determine the wing position. Instead, the CMS 15 uses the same camera 20 and image capture unit that provides the legally prescribed views to the display 18 for the wing position verification feature. An image processing algorithm 46 is in communication with the controller 30 (e.g., residing in memory 42 as software) to extract the features from images captured by the image capture unit of the camera 20. The image processing algorithm 46 uses known image processing techniques to extract features from the captured images for a variety of CMS functionalities. For example, the image processing algorithm 46 may extract lines, shapes, colors, patterns and other attributes from the captured image. These extracted attributes can be used to detect objects such as tractor wheels, lane markers, trailer edges and other features. Example wheel detection algorithm techniques are disclosed in U.S. application Ser. No. 18/080,031 entitled "CAMERA MONITOR SYSTEM FOR COMMERCIAL VEHICLES INCLUDING WHEEL POSITION ESTIMATION", filed on Dec. 13, 2022 and U.S. Provisional Application Ser. No. 63/405,912 entitled "CAMERA MONITOR SYSTEM FOR COMMERCIAL VEHICLES INCLUDING WHEEL POSITION ESTIMATION", filed on Sep. 13, 2022, both of which are incorporated herein by reference in its entirety. Example trailer edge detection algorithm techniques are disclosed in U.S. application Ser. No. 17/952,459 entitled "TRAILER END TRACKING IN CAMERA MONITORING SYSTEM", filed Sep. 26, 2022 and U.S. Provisional Application Ser. No. 63/405,152 entitled "CAMERA MONITORING SYSTEM INCLUDING TRAILER PRESENCE DETECTION USING OPTICAL FLOW", filed on Sep. 9, 2022, which are incorporated herein by reference in its entirety. Example awareness indicator algorithm techniques are disclosed in Unites States application Ser. No. 18/134,261 entitled "CAMERA MIRROR SYSTEM INCLUDING AUTOMATIC ANGULAR ADJUSTMENT FOR COMMERCIAL VEHICLE DISPLAYS", filed on Apr. 13, 2023 and U.S. application Ser. No. 18/124,646 entitled "DYNAMIC LONGITUDINAL AND LATERAL ADJUSTMENT OF AWARENESS LINES FOR COMMERCIAL VEHICLE CAMERA MIRROR SYSTEM", filed on Mar. 22, 2023, which are incorporated herein by reference in its entirety.

Figure 3B:
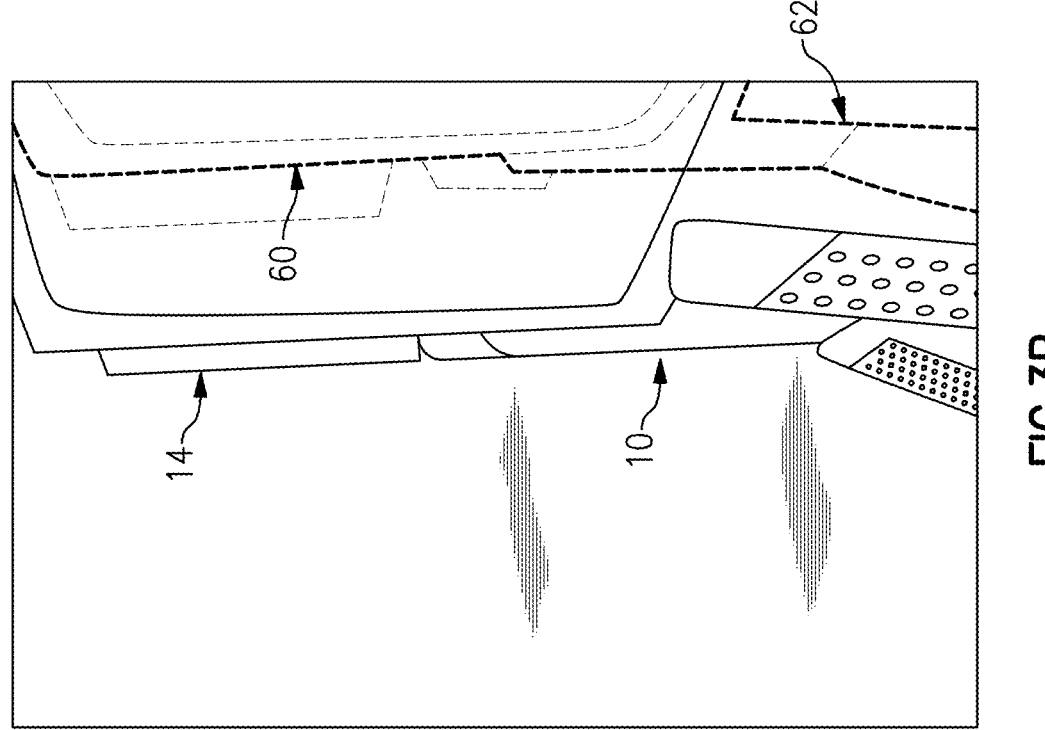
FIGS. 3A and 3B respectively correspond to a calibrated image and a current image, which does not correspond to the calibrated image.
Figure 3A:
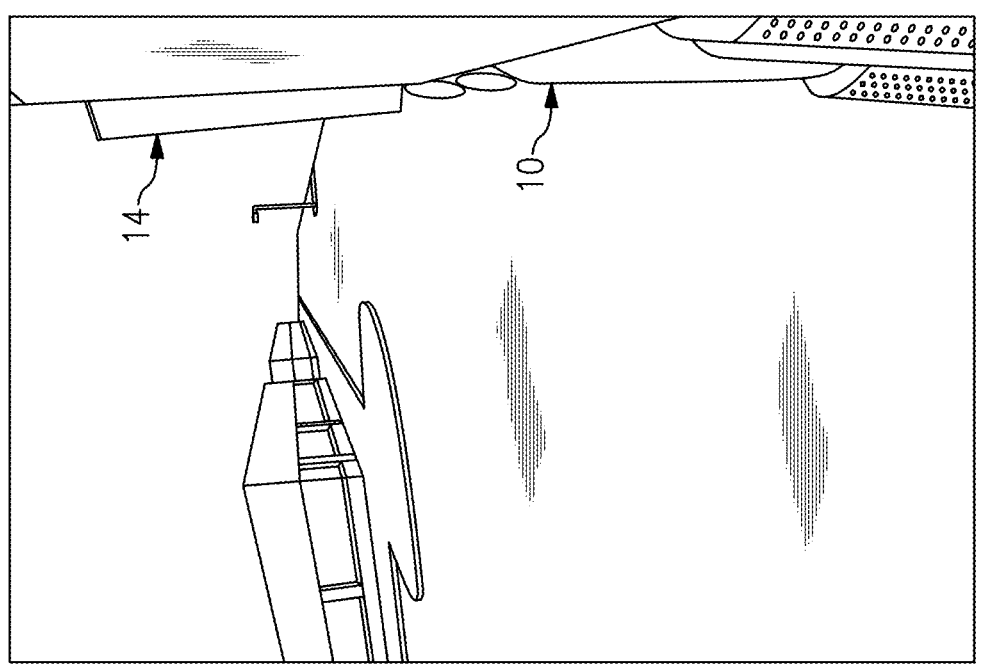
Figure 4:
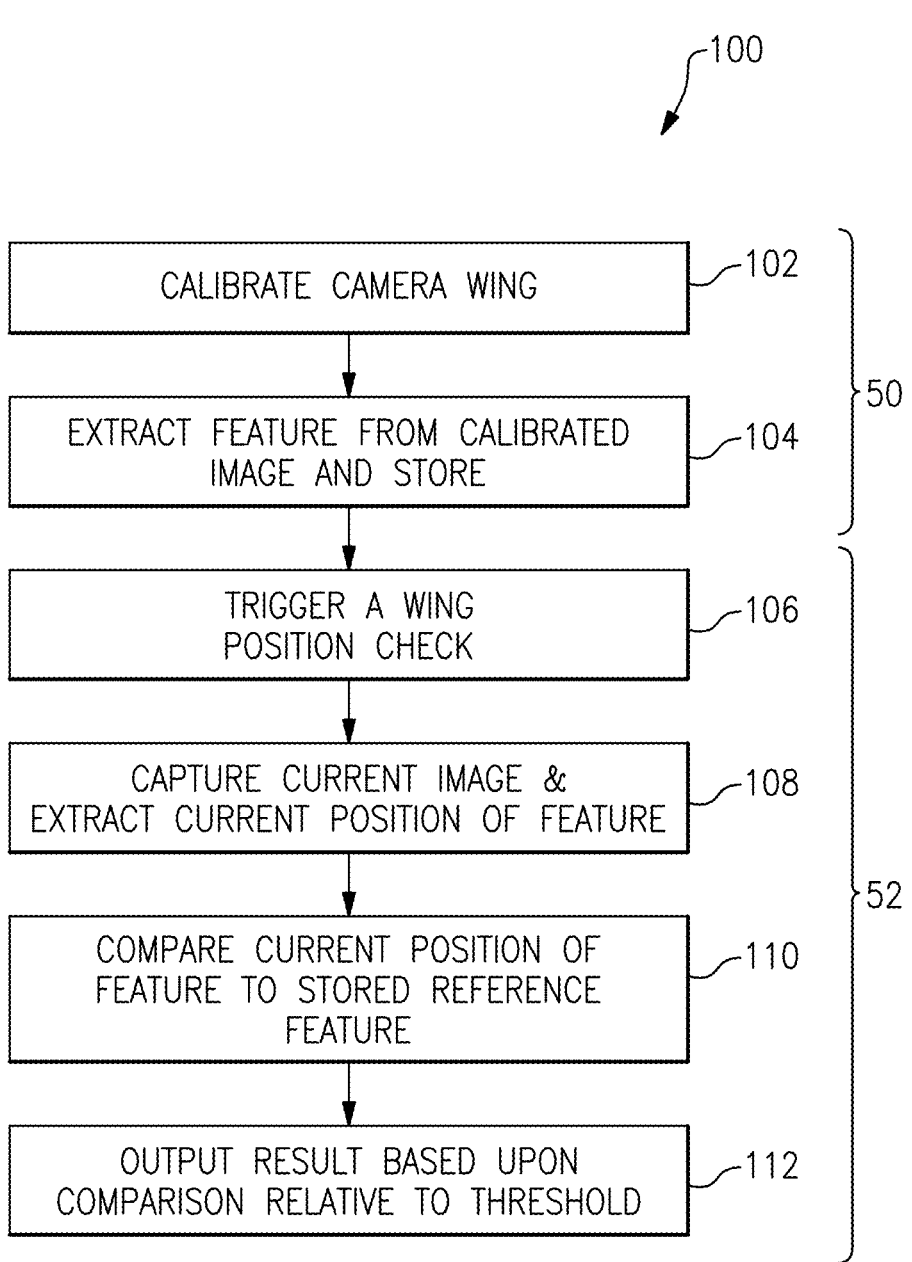
FIG. 4 is a method of wing position verification for the CMS.

The CMS 15 includes a calibration module 50 that is used after the cameras 20 have been calibrated upon installation of the CMS 15 and the camera arms 16 into the vehicle. The calibration module 50 is a routine (e.g., software residing on memory 42) that is performed by the controller 30 once the legally prescribed views have been established. As shown in the wing position verification method 100 in FIG. 4, the calibration module is used to calibrate a wing position and its supported camera relative to the vehicle in order to provide the desired field of view (block 102). The calibration module extracts a reference feature from a calibrated image from the image capture unite of the camera 20 (block 104). An example calibrated image is shown in FIG. 3A. The reference feature may be a body contour line, component (62 in FIG. 3B), vertical edge (60 in FIG. 3B) or marking on the vehicle. In the case of the camera arm 16 being mounted to the tractor 12, it is desirable to extract the reference feature from the tractor 12, as a trailer 14 the trailer 14 move during use and may not be attached to the tractor upon installation of the calibration of the CMS 15 onto the tractor 12, or when a wing position verification is desired.

The CMS 15 also includes a wing position verification module 52 and which also uses the image processing algorithm 46. The wing verification module 52 is a routine (e.g., software residing on memory 42) that is performed by the controller 30. As shown in the method 100 in FIG. 4, the wing position verification module 52 is utilized in response to an event in which a wing position check is desired (block 106). The wing position check may be triggered based upon the operational state of the vehicle. For example, when the engine is started and/or when the vehicle is shifted out of park and into a gear (reverse or a forward gear), it may be desirable to initiate a wing position check. Alternatively or additionally, a wing position check may occur at a predetermined time interval during vehicle operation, such as every few seconds.

Once a wing position verification has been triggered, a current image (FIG. 3B) is captured by the camera 20, and image processing algorithm 46 attempts to extracts the current position of the same feature(s) previously captured and stored during calibration (block 108). The current position of the reference feature is compared to the stored reference feature to see if the camera 20 has been undesirably moved from its initially calibrated position (block 110), which may result in the camera being unable to provide the legally described view. This comparison may be performed by comparing a distance between at least a portion of the stored reference feature from the current position of the reference feature in 2-dimensional space. The distance may correspond to the distance between pixels in the captured images from the image capture unit of the calibrated image and the current image.

It may be desirable to provide some minimal discrepancy between the current position of the reference feature compared to the stored reference feature to prevent any false alerts relating to the wing position being out of its desired position. For example, one example calibrated camera provides a field of view of 70 degrees, whereas a legally prescribed field of view may only be 50 degrees. Thus, there may be some tolerance with respect to the camera wing being out of position and the legally described view still being provided. Accordingly, the output result is based upon a comparison relative to a threshold value (block 112; e.g., reference feature and current position of same feature being within a predetermined number of pixels). The output may be a visible warning on the display 18, for example, or an audible warning.

Figure 5A:
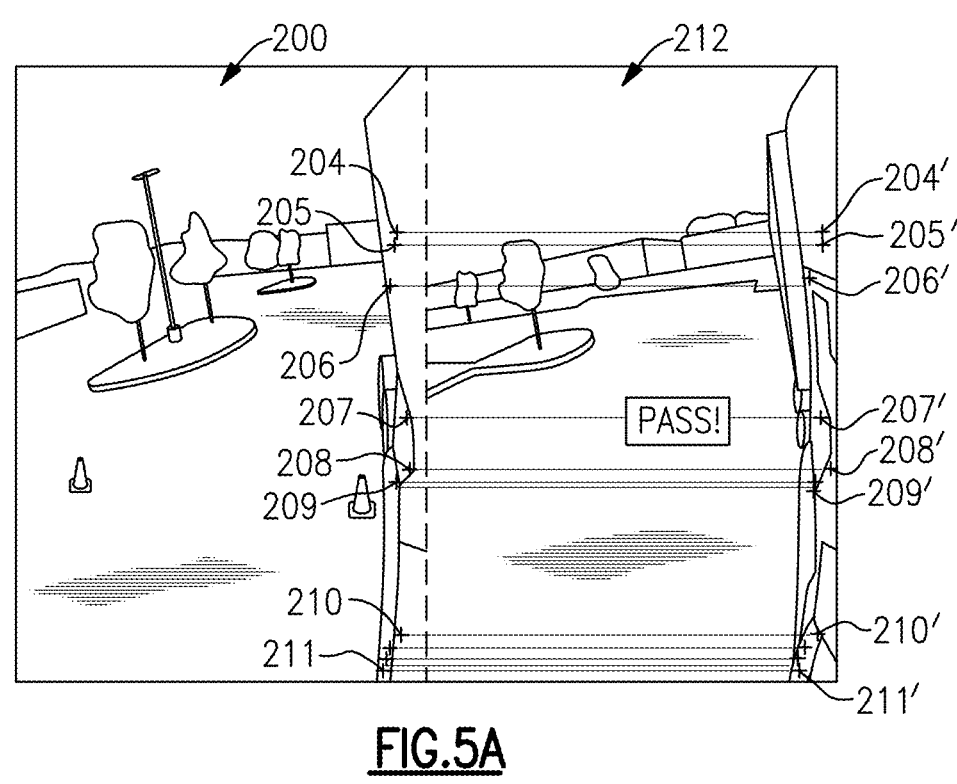
FIG. 5A illustrates an "acceptable" result following an example wing position verification.
Figure 5B:
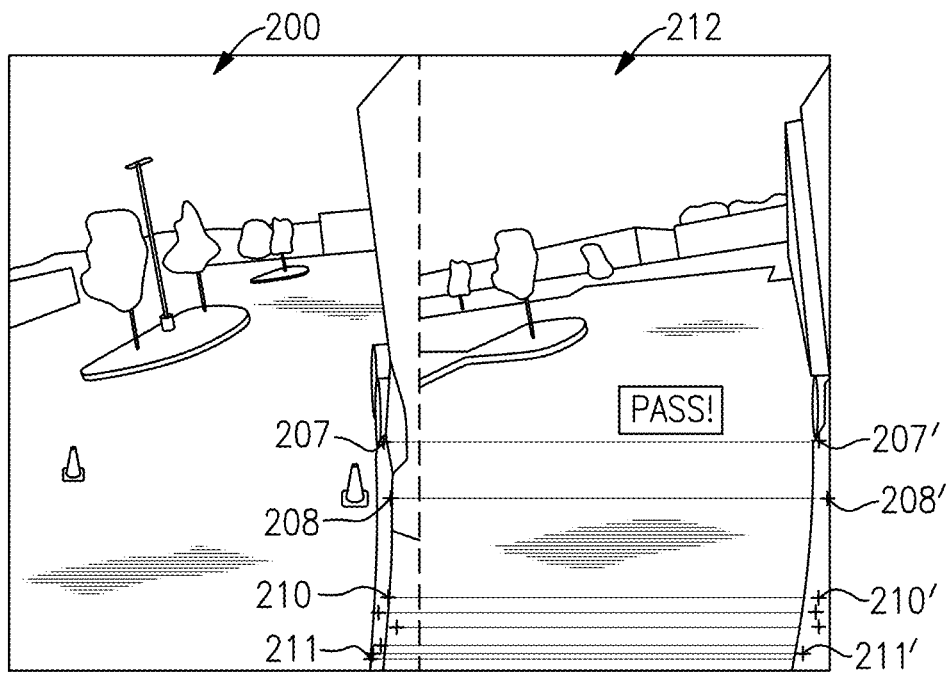
FIG. 5B illustrates another "acceptable" result following an example wing position verification.
Figure 5C:
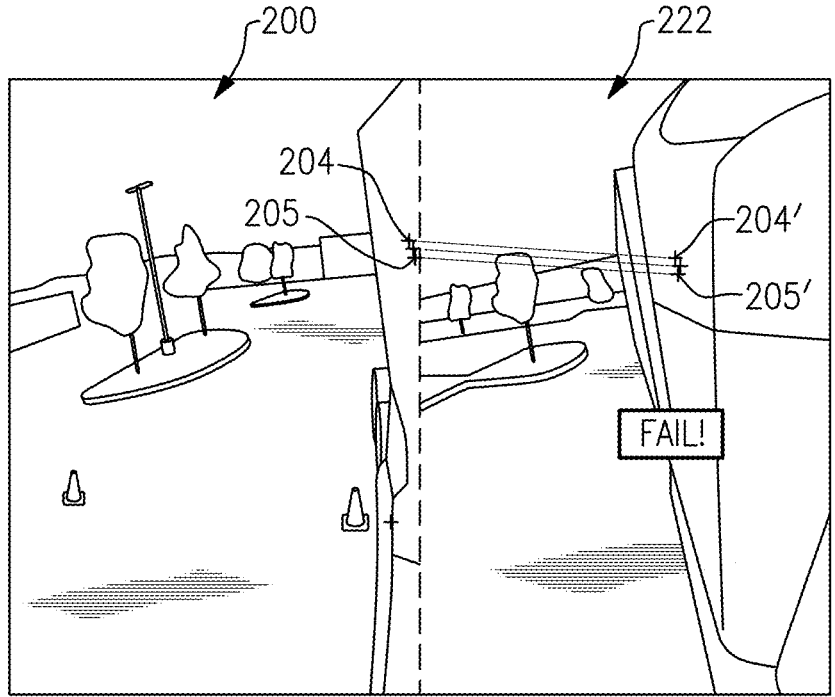
FIG. 5C illustrates an "unacceptable" result following an example wing position verification.

Examples of the wing folding verification are shown in FIGS. 5A-5C. View 200 illustrates the original calibrated wing position in which the legally prescribed views are provided. View 202 in FIG. 5A represents a wing verification in which the camera arm is determined to be deployed in the originally calibrated position, like view 200. View 212 in FIG. 5B represents a wing verification in which the camera arm is slightly out of position relative to the originally calibrated position, but still is able to provide the legally prescribed views. View 222 in FIG. 5C represents a wing verification in which the camera arm is out of position in which it can no longer provide the legally prescribed views. The views 200, 202, 212, 222 are depicted on the Class II (narrow FOV) portion of the passenger display 18, in the illustrated examples.

The points 204-211, 204'-211' and lines are shown for illustrative purposes only and would not be shown on the display 18. Points 204-211 correspond to various reference features from a calibrated image from the camera. Points 204'-211' correspond to current positions of the like numbered reference features in connection with the wing position verification process. The lines indicate horizontal matching of the reference feature in the calibrated position and its current position for illustrative purposes only.

The points 204'-211' shown in the views 202, 212, 214 are those having a sufficiently close pixel distance, for example, to the original reference feature (e.g., within 10 pixels of the original reference feature). If the current position of a sufficient predetermined number of the reference features is maintained, then the wing position can be assumed to be able to provide the legally prescribed views (e.g., FIG. 5B). But, if this threshold number of reference features is not maintained, then the camera arm is too far out of position (e.g., FIG. 5C), which is indicative of a camera arm issue that should be addressed.

If the wing position is determined to be out of its desired position and the camera arm 16 is powered with a motor 39, the CMS 15 may actuate the foldable portion 19 to the folded/stowed position and then attempt to redeploy the foldable portion 19 to its unfolded/operating position to restore the desired field of view. At this point, the wing position verification module 52 may again check the new current position relative to the stored reference feature. This procedure may capture multiple images during the folding operation, and those images may be analyzed in real time to identify the camera arm position in which a sufficient number of the current feature positions match the original feature positions in the stored capture image. The motor 39 can then be deenergized, maintaining the camera arm at a position that provides the legally prescribed views.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of checking wing position in a camera monitor system, comprising:

calibrating a wing position supporting a camera relative to a vehicle to provide a desired field of view;

extracting a reference feature from a calibrated image from the camera, wherein the reference feature is provided on a tractor of the vehicle;

storing the reference feature;

triggering a wing position check based upon at least one of a gear position, an engine operating state, and a predetermined time interval;

capturing a current image from the camera, the current image having a current position of the reference feature;

comparing the current position of the reference feature to the stored reference feature; and outputting a result of the wing position check if a difference from the comparing step exceeds a threshold value.

2. The method of claim 1, wherein the calibrating step is performed upon installation of the wing onto the vehicle.

3. The method of claim 2, wherein the calibrating step is performed with the wing in an unfolded position and the camera trained upon a legally prescribed field of view.

4. The method of claim 1, wherein the reference feature includes a vertical edge of the tractor.

5. The method of claim 1, wherein the comparing step includes comparing a distance between at least a portion of the stored reference feature from the current position of the reference feature in 2D space.

6. The method of claim 5, wherein the distance is a distance between pixels in captured images of the calibrated image and the current image.

7. The method of claim 1, wherein the result is at least one of a visible warning and an audible warning.

8. A camera monitor system (CMS) for a vehicle, comprising:

a wing having a fixed portion configured to be secured to a vehicle, and a foldable portion pivotably mounted on the fixed portion;

a camera mounted to the foldable portion and having a camera with an image capture unit configured to provide a desired field of view of the vehicle;

a display configured to depict at least a portion of the field of view;

an input configured to trigger a wing position check, wherein the input is at least one of a gear position sensor configured to provide a gear position, an engine sensor configured to provide an engine operating state, and a predetermined time interval; and a controller in communication with the camera and the display, the controller including a calibration module in which a reference feature is extracted from a calibrated image of the camera in which the desired field of view is provided, wherein the reference feature is provided on a tractor of the vehicle, the controller having a memory in which the reference feature is stored, the controller including a wing position verification module responsive to the input, the wing position verification module configured to capture a current image from the camera having a current position of the reference feature, comparing the current position reference feature to the stored reference feature, and outputting a result of the wing position check if a difference from comparing step exceeds a threshold value.

9. The CMS of claim 8, wherein the wing includes a motor in communication with the controller, the motor configured to fold and unfold the foldable portion relative to the fixed portion in response to a command from the controller, wherein the controller is configured to send the command to the motor in response to the difference being above the threshold value in order to actuate the foldable portion and provide the desired field of view.

10. The CMS of claim 8, wherein the output is a visible warning on the display.

11. The CMS of claim 8, wherein the desired view corresponds to a legally prescribed view providing at least one of Class II and Class IV views.

12. The CMS of claim 8, wherein the reference feature includes a vertical edge of the tractor.

13. The CMS of claim 8, wherein the comparing step includes comparing a distance between at least a portion of the stored reference feature from the current position of the reference feature in 2D space.

14. The CMS of claim 13, wherein the distance is a distance between pixels in captured images of the calibrated image and the current image.

* * * * *